(12) United States Patent
Kumar et al.

(10) Patent No.: US 10,489,190 B2
(45) Date of Patent: Nov. 26, 2019

(54) TASK COMPLETION THROUGH INTER-APPLICATION COMMUNICATION

(71) Applicant: Microsoft Technology Licensing, LLC, Redmond, WA (US)

(72) Inventors: Amit Kumar, Redmond, WA (US); Shajib Sadhukha, Seattle, MD (US); Zhaowei Jiang, Palo Alto, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/713,375

(22) Filed: Dec. 13, 2012

(65) Prior Publication Data
US 2014/0173625 A1 Jun. 19, 2014

(51) Int. Cl.
*G06F 9/46* (2006.01)
*G06F 9/48* (2006.01)

(52) U.S. Cl.
CPC .................................. *G06F 9/4843* (2013.01)

(58) Field of Classification Search
None
See application file for complete search history.

(56) References Cited

U.S. PATENT DOCUMENTS

| | | |
|---|---|---|
| 5,394,549 A | 2/1995 | Stringfellow et al. |
| 6,898,622 B1 | 5/2005 | Malik |
| 7,016,855 B2 | 3/2006 | Eaton et al. |
| 7,035,901 B1 | 4/2006 | Kumagai et al. |
| 7,233,229 B2 | 6/2007 | Stroupe et al. |
| 7,349,920 B1 | 3/2008 | Feinberg et al. |
| 7,363,294 B2 | 4/2008 | Billsus et al. |
| 7,543,237 B2 | 6/2009 | Kontny et al. |

(Continued)

FOREIGN PATENT DOCUMENTS

| | | |
|---|---|---|
| CN | 101395567 | 3/2009 |
| CN | 102147898 | 8/2011 |

(Continued)

OTHER PUBLICATIONS

Abrams, How to open a file with a different program on your Mac, Bleepingcomputer.com, Oct. 1, 2011, 3 pages.*

(Continued)

*Primary Examiner* — Diem K Cao

(57) ABSTRACT

Among other things, one or more techniques and/or systems for facilitating task completion through inter-application communication and/or for registering a target application for contextually aware task execution are provided. That is, a current application may display content comprising an entity (e.g., a mapping application may display a restaurant entity). One or more actions capable of being performed on the entity may be exposed (e.g., a reserve table action). Responsive to selection of an action, one or more target applications capable of performing the action on the entity may be presented. Responsive to selection of a target application, contextual information for the entity and/or the action may be passed to the target application so that the target application may be launched in a contextually relevant state to facilitate completion of a task. For example, a dinning application may be launched to a table reservation form for the restaurant entity.

20 Claims, 9 Drawing Sheets

(56) References Cited

U.S. PATENT DOCUMENTS

| | | | |
|---|---|---|---|
| 7,548,895 B2 | 6/2009 | Pulsipher et al. | |
| 7,685,414 B1 | 3/2010 | Appenzeller | |
| 7,941,761 B2* | 5/2011 | Hally | H04L 29/06027 |
| | | | 715/779 |
| 8,069,422 B2 | 11/2011 | Sheshagiri et al. | |
| 8,185,427 B2 | 5/2012 | Messer et al. | |
| 8,201,176 B2 | 6/2012 | Tatsubori et al. | |
| 8,375,320 B2 | 2/2013 | Kotler et al. | |
| 3,528,059 A1 | 9/2013 | Labana et al. | |
| 8,560,371 B2 | 10/2013 | Levitt et al. | |
| 8,587,793 B2 | 11/2013 | Naito et al. | |
| 8,949,275 B1 | 2/2015 | Aasuri-Maringanti | |
| 8,990,143 B2 | 3/2015 | Hohndel et al. | |
| 9,008,631 B2 | 4/2015 | Small et al. | |
| 9,111,291 B2 | 8/2015 | Lempel et al. | |
| 9,122,542 B1 | 9/2015 | Nelissen | |
| 9,313,162 B2 | 4/2016 | Kumar et al. | |
| 9,460,422 B2 | 10/2016 | Reter et al. | |
| 9,658,872 B1 | 5/2017 | Hanna | |
| 9,832,149 B2 | 11/2017 | Uraizee et al. | |
| 2002/0010746 A1 | 1/2002 | Jilk | |
| 2002/0061741 A1 | 5/2002 | Leung et al. | |
| 2003/0220937 A1 | 11/2003 | Maeoka et al. | |
| 2004/0059712 A1 | 3/2004 | Dean | |
| 2004/0249709 A1 | 12/2004 | Donovan | |
| 2005/0108074 A1 | 5/2005 | Bloechl et al. | |
| 2005/0132010 A1 | 6/2005 | Muller | |
| 2005/0192992 A1 | 9/2005 | Reed et al. | |
| 2005/0267770 A1 | 12/2005 | Banavar et al. | |
| 2005/0268303 A1 | 12/2005 | Anderson et al. | |
| 2005/0268306 A1 | 12/2005 | Anspach et al. | |
| 2005/0289470 A1 | 12/2005 | Pabla | |
| 2006/0069599 A1 | 3/2006 | Hatoun et al. | |
| 2006/0069666 A1* | 3/2006 | Burke | G06Q 10/063 |
| 2006/0149677 A1 | 7/2006 | Shahine | |
| 2006/0282298 A1 | 12/2006 | Azvine et al. | |
| 2007/0027732 A1 | 2/2007 | Hudgens | |
| 2007/0244736 A1 | 10/2007 | Johnson et al. | |
| 2008/0005108 A1 | 1/2008 | Ozzie et al. | |
| 2008/0005168 A1 | 1/2008 | Huff et al. | |
| 2008/0034315 A1 | 2/2008 | Langoulant et al. | |
| 2008/0086640 A1 | 4/2008 | Voss | |
| 2008/0126961 A1 | 5/2008 | Naaman et al. | |
| 2008/0178110 A1 | 7/2008 | Hill et al. | |
| 2009/0025013 A1 | 1/2009 | Hattori | |
| 2009/0089133 A1 | 4/2009 | Johnson et al. | |
| 2009/0111425 A1 | 4/2009 | Forbes et al. | |
| 2009/0150761 A1 | 6/2009 | Sawicki et al. | |
| 2009/0239552 A1 | 9/2009 | Churchill et al. | |
| 2009/0254824 A1* | 10/2009 | Singh | G01C 21/3679 |
| | | | 715/716 |
| 2010/0031198 A1* | 2/2010 | Zimmerman | G06F 3/0482 |
| | | | 715/853 |
| 2010/0037222 A1 | 2/2010 | Tatsubori et al. | |
| 2010/0125548 A1 | 5/2010 | Anzai et al. | |
| 2010/0169176 A1 | 7/2010 | Turakhia | |
| 2010/0223575 A1 | 9/2010 | Leukart et al. | |
| 2010/0257015 A1 | 10/2010 | Molander | |
| 2011/0045841 A1 | 2/2011 | Kuhlke et al. | |
| 2011/0131285 A1 | 6/2011 | Liao | |
| 2011/0145823 A1 | 6/2011 | Rowe et al. | |
| 2011/0219433 A1 | 9/2011 | Albrecht-buehler | |
| 2011/0276396 A1* | 11/2011 | Rathod | 705/14.49 |
| 2011/0276896 A1 | 11/2011 | Zambetti et al. | |
| 2011/0283230 A1 | 11/2011 | Gnanasambandam et al. | |
| 2011/0313803 A1 | 12/2011 | Friend et al. | |
| 2012/0095815 A1 | 4/2012 | Glaser | |
| 2012/0144281 A1 | 6/2012 | Schechter | |
| 2012/0159536 A1 | 6/2012 | Treacy et al. | |
| 2012/0191694 A1 | 7/2012 | Gardiol | |
| 2012/0197977 A1 | 8/2012 | Nagasaka | |
| 2012/0221384 A1* | 8/2012 | Avadhanam et al. | 705/14.4 |
| 2012/0221975 A1* | 8/2012 | Juristovski et al. | 715/823 |
| 2012/0223890 A1 | 9/2012 | Borovsky | |
| 2012/0242482 A1 | 9/2012 | Elumalai et al. | |
| 2012/0253916 A1 | 10/2012 | Ayloo | |
| 2012/0266174 A1 | 10/2012 | Inoue | |
| 2012/0278821 A1* | 11/2012 | Tran et al. | 719/328 |
| 2012/0311585 A1 | 12/2012 | Gruber et al. | |
| 2012/0330702 A1* | 12/2012 | Kowalski | G06Q 10/00 |
| | | | 705/7.11 |
| 2013/0006689 A1 | 1/2013 | Kinnear et al. | |
| 2013/0091453 A1 | 4/2013 | Kotler et al. | |
| 2013/0117208 A1* | 5/2013 | Dousse | G06Q 30/0202 |
| | | | 706/21 |
| 2013/0218985 A1* | 8/2013 | Thazhmon | G06Q 10/10 |
| | | | 709/206 |
| 2013/0268507 A1 | 10/2013 | Macbeth et al. | |
| 2013/0275429 A1 | 10/2013 | York et al. | |
| 2013/0282755 A1* | 10/2013 | Procopio | G06F 17/30126 |
| | | | 707/770 |
| 2013/0311285 A1 | 11/2013 | Abrol et al. | |
| 2013/0311997 A1 | 11/2013 | Gruber et al. | |
| 2013/0346247 A1* | 12/2013 | Bash et al. | 705/26.61 |
| 2013/0346981 A1 | 12/2013 | Johnson et al. | |
| 2014/0033071 A1 | 1/2014 | Gruber et al. | |
| 2014/0081690 A1 | 3/2014 | Winters | |
| 2014/0082521 A1 | 3/2014 | Carolan et al. | |
| 2014/0089822 A1 | 3/2014 | Wu et al. | |
| 2014/0101599 A1* | 4/2014 | Gandhi et al. | 715/779 |
| 2014/0130060 A1 | 5/2014 | Pope et al. | |
| 2014/0172986 A1 | 6/2014 | Kumar et al. | |
| 2014/0173602 A1 | 6/2014 | Kikin-Gil et al. | |
| 2014/0278513 A1 | 9/2014 | Prakash et al. | |
| 2014/0317027 A1 | 10/2014 | Elumalai et al. | |
| 2014/0337175 A1* | 11/2014 | Katzin | G06Q 20/204 |
| | | | 705/26.62 |
| 2014/0365951 A1 | 12/2014 | Fernandes et al. | |
| 2015/0006564 A1 | 1/2015 | Tomkins et al. | |
| 2015/0095268 A1 | 4/2015 | Greenzeiger et al. | |
| 2015/0100503 A1 | 4/2015 | Lobo et al. | |
| 2015/0112985 A1 | 4/2015 | Roggero et al. | |
| 2015/0118672 A1 | 4/2015 | Yeskel et al. | |
| 2015/0242091 A1 | 8/2015 | Lu et al. | |
| 2015/0269508 A1 | 9/2015 | Damboritz et al. | |
| 2015/0317582 A1 | 11/2015 | Nath et al. | |
| 2016/0071064 A1 | 3/2016 | Itani et al. | |
| 2016/0086116 A1 | 3/2016 | Rao et al. | |
| 2016/0094499 A1 | 3/2016 | Uraizee et al. | |
| 2016/0161280 A1 | 6/2016 | Shahine et al. | |
| 2016/0180279 A1 | 6/2016 | Koerner et al. | |
| 2016/0203143 A1 | 7/2016 | Kritt et al. | |
| 2016/0219003 A1 | 7/2016 | Kumar et al. | |
| 2016/0350367 A1 | 12/2016 | Fischer et al. | |
| 2016/0379175 A1 | 12/2016 | Bhattacharya et al. | |
| 2017/0193835 A1 | 7/2017 | Bonney-ache et al. | |
| 2018/0129371 A1 | 5/2018 | Fowler et al. | |
| 2018/0129993 A1 | 5/2018 | Fowler et al. | |
| 2018/0129994 A1 | 5/2018 | Fowler et al. | |
| 2018/0129995 A1 | 5/2018 | Fowler et al. | |
| 2018/0130007 A1 | 5/2018 | Fowler et al. | |

FOREIGN PATENT DOCUMENTS

| | | |
|---|---|---|
| CN | 102253860 | 11/2011 |
| CN | 102521317 | 6/2012 |
| CN | 102737303 | 10/2012 |
| JP | 2000-029945 | 1/2000 |
| WO | 9742568 A1 | 11/1997 |
| WO | 2010/010967 | 1/2012 |
| WO | 2012/167168 | 12/2012 |

OTHER PUBLICATIONS

Conder et al., Quick Tip: Enabling Users to Send Email From Your Android Applications—The Easy Way, Jul. 2010, 34 pages.*

Williams, Setting up payment options in BlackBerry App World, Apr. 2011, 4 pages.*

Ongtang et al, Semantically Rich Application-Centric Security in Adndroid, The Pennsylvania State University, 2009, 10 pages.*

Hoffman, An Introduction to Charms in Windows 8: What they are and How to Use them; May 2012, 8 pages.*

(56) References Cited

OTHER PUBLICATIONS

Int. Search Report cited in PCT Application No. PCT/US2013/075182 dated Mar. 18, 2014, 8 pgs.
"Gmail Ads Within Email Thread—Is This New?", Richard Macmanus, Sep. 6, 2009, reprinted from the Internet at: http://readwrite.com/2009/09/06/gmail_ads_within_email_thread_-_is_this_new, 2 pgs.
"Piggyback E-Mail", Feb. 11, 2005, reprinted from the Internet at: http://www.webopedia.com/TERM/P/piggyback_e_mail.html, 2 pgs.
"Where media buyers start online", Yahoo! Mail Beta Uses Email Keywords for Ad Targeting, Gavin Dunaway, May 23, 2011, reprinted from the Internet at: http://www.adotas.com/2011/05/yahoo-mail-beta-uses-email-keywords-for-ad-targeting/, 7 pgs.
"iOS App Programming Guide"—Published Date: Sep. 9, 2012, pp. 144 http://developer.apple.com/library/ios/documentation/iphone/conceptual/iphoneosprogrammingguide/iPhoneAppProgrammingGuide.pdf.
Keggstra, Greg, "Announcing the OpenID Backplane Protocol Work Group"—Published Date: Aug. 21, 2012, http://openid.net/tag/developers/.
Chin, et al., "Analyzing Inter-Application Communication in Android"—Published Date: Jun. 28, 2011 Proceedings: Proceedings of the 9th International Conference on Mobile systems, Applications, and Services, pp. 14, http://www.cs.berkeley.edu/~emc/papers/mobi168-chin.pdf.
"App Contracts and Extensions (Windows Store Apps)"—Published Date: Oct. 15, 2012, http://msdn.microsoft.com/en-us/library/windows/apps/hh464906.aspx.
U.S. Appl. No. 13/713,279, Office Action dated Mar. 25, 2015, 18 pgs.
U.S. Appl. No. 13/713,279, Amendment and Repsonse filed Jul. 27, 2015, 12 pgs.
U.S. Appl. No. 13/713,279, Office Action dated Aug. 13, 2015, 7 pgs.
U.S. Appl. No. 13/713,279, Amendment and Repsonse filed Nov. 13, 2015, 11 pgs.
U.S. Appl. No. 13/713,279, Notice of Allowance dated Dec. 7, 2015, 7 pgs.
European Communication in Application 13821242.8, dated Jul. 21, 2015, 2 pgs.
U.S. Appl. No. 15/087,266, Office Action dated Aug. 18, 2017, 13 pages.
Chinese Office Action in Application 201380065290.1, dated Sep. 8, 2017, 12 pages.
Japanese Notice of Rejection in Application 2015-548021, dated Oct. 20, 2017, 4 pgs.
"1Calendar", http://1calendar.appappeal.com/, Published on: Aug. 17, 2011, 12 pages.
Bellotti et al., "Taking Email to Task: The Design and Evaluation of a Task Management Centered Email Tool", In Proceedings of the SIGCHI Conference on Human Factors in Computing Systems, Apr. 5, 2003, 8 pages.
Dey et al., "CybreMinder: A Context-Aware System for Supporting Reminders", In Proceedings of 2nd international symposium on Handheld and Ubiquitous Computing, Sep. 25, 2000, pp. 172-186.
Dey et al., "Towards a Better Understanding of Context and Context-Awareness", In Proceedings of 1st international symposium on Handheld and Ubiquitous Computing, Sep. 27, 1999, 12 pages.
Dube, Ryan, "Coolendar—A Cool Calendar & To-Do List in One", http://www.makeuseof.com/tag/coolendar-calendar-todo-list/, Published on: Sep. 7, 2011, 7 pages.
"Identify the Context", In Journal of IEEE Professional Communication Society, Apr. 11, 2016, 3 pages.
Lida et al., "Breadcrumb Navigation: an Exploratory Study of Usage", http://usabilitynews.org/breadcrumb-navigation-an-exploratory-study-of-usage/, Published on: Feb. 11, 2003, 6 pages.
Martin, James A., "'Handle' iOS App Mercifully Merges Email, Calendars and Tasks", http://www.cio.com/article/2875912/mobile-apps/handle-ios-app-mercifully-merges-email-calendars-and-tasks.html, Published on: Jan. 27, 2015, 3 pages.
Matteson, Scott, "Organize your Gmail Tasks using the GTasks application", http://www.techrepublic.com/blog/google-in-the-enterprise/organize-your-gmail-tasks-using-the-gtasks-application/, Published on: Apr. 12, 2013, 28 pages.
Miles, Stephanie, "Coolendar—A Better Way to Plan Ahead", http://www.appvita.com/2011/09/15/coolendar-online-scheduling-and-appointment/, Published on: Sep. 15, 2011, 3 pages.
"Remember The Milk", https://play.google.com/store/apps/details?id=com.rememberthemilk.MobileRTM&hl=en, Published on: Aug. 29, 2016, 3 pages.
"Task Management Made Delightfully Simple", https://hitask.com/, Retrieved on: Nov. 10, 2016, 5 pages.
"Ticktick—Your Lightweight Task Manager", https://ticktick.com/, Retrieved on: Nov. 10, 2016, 4 pages.
"Todoist", https://en.todoist.com/, Retrieved on: Nov. 10, 2016, 8 pages.
"Wunderlist—Keep your life in sync", https://www.wunderlist.com/, Retrieved on: Nov. 10, 2016, 5 pages.
"Wunderlist: To-Do List & Tasks", https://www.microsoft.com/en-in/store/p/wunderlist-to-do-list-tasks/9wzdncrdfxzs, Retrieved on: Nov. 10, 2016, 5 pages.
PCT International Search Report and Written Opinion Issued in PCT Application No. PCT/US2017/059812, dated Jan. 3, 2018, 12 Pages.
U.S. Appl. No. 15/087,266, Amendment and Response filed Jan. 17, 2018, 13 pages.
Chinese 1st Office Action in Application 201380065593.3, dated Jun. 14, 2017, 15 pgs.
European Extended Search Report in Application 13818562.4, dated May 13, 2016, 8pgs.
European Office Action in Application 13818562.4, dated Oct. 18, 2017, 8 pages.
Haas, et al., "CONTASK—Using Context-Sensitive Assistance to Improve Task-Oriented Knowledge Work", Proceedings of the 12th International Conference on Enterprise Information Systems, vol. 2, 10 pages (Jun. 8, 2010).
Japanese Office Action in Application 2015-547546, dated Aug. 28, 2017, 6 pages.
PCT International Preliminary Report on Patentability in Application PCT/US2013/074697, dated Jun. 25, 2015, 7 pages.
PCT International Search Report & Written Opinion for Application PCT/US2013/074697, dated Jun. 30, 2014, 10 pages.
U.S. Appl. No. 13/715,434, Amendment and Response filed Dec. 26, 2014, 20 pages.
U.S. Appl. No. 13/715,434, Amendment and Response filed Dec. 28, 2016, 16 pages.
U.S. Appl. No. 13/715,434, Amendment and Response filed Apr. 4, 2016, 14 pages.
U.S. Appl. No. 13/715,434, Amendment and Response filed Aug. 24, 2015, 15 pages.
U.S. Appl. No. 13/715,434, Office Action dated Nov. 3, 2015, 28 pages.
U.S. Appl. No. 13/715,434, Office Action dated Feb. 8, 2017, 30 pages.
U.S. Appl. No. 13/715,434, Office Action dated Apr. 22, 2015, 28 pages.
U.S. Appl. No. 13/715,434, Office Action dated Jul. 28, 2016, 29 pages.
U.S. Appl. No. 13/715,434, Office Action dated Aug. 27, 2014, 24 pages.
U.S. Appl. No. 15/087,266, Office Action dated Feb. 14, 2018, 14 pages.
PCT International Search Report and Written Opinion Issued in PCT Application No. PCT/US2017/059633, dated Jan. 3, 2018, 12 Pages.
PCT International Search Report and Written Opinion Issued in PCT Application No. PCT/US2017/059634, dated Jan. 3, 2018, 12 Pages.
"International Search Report and Written Opinion Issued in PCT Application No. PCT/US2017/059636", dated Jan. 8, 2018, 10 Pages.
"Non Final Office Action Issued in U.S. Appl. No. 15/450,874", dated Sep. 21, 2018, 24 Pages.

(56) References Cited

OTHER PUBLICATIONS

"Office Action Issued in Chinese Patent Application No. 201380065290.1", dated May 3, 2018, 5 Pages.
"Office Action Issued in Chinese Patent Application No. 201380065593.3", dated Apr. 10, 2018, 11 Pages.
Dixa, et al., "From the Web of Data to a World of Action", In Journal of the Web Semantics: Science, Services and Agents on the World Wide Web, vol. 8, Issue 4, Nov. 1, 2010, 15 Pages.
"Final Office Action Issued in U.S. Appl. No. 15/450,874", dated Feb. 7, 2019, 22 Pages.
"Non Final Office Action Issued in U.S. Appl. No. 15/450,714", dated May 16, 2019, 13 Pages.
"Non Final Office Action Issued in U.S. Appl. No. 15/450,874", dated Apr. 29, 2019, 39 Pages.
Non-Final Office Action Issued in U.S. Appl. No. 15/450,521 dated May 31, 2019 18 Pages.
"Non Final Office Action Issued in U.S. Appl. No. 15/450,758", dated Jun. 21, 2019, 13 Pages.
"Non Final Office Action Issued in U.S. Appl. No. 15/450,825", dated Jun. 19, 2019, 16 Pages.

* cited by examiner

TASK COMPLETION THROUGH INTER-APPLICATION COMMUNICATION

BACKGROUND

Many users utilize computing devices, such as mobile phones, tablet devices, and/or personal computers, to perform various types of actions. In one example, a user may input a speech command "what is today's news" into a mobile phone. The mobile phone may provide the user with a list of news website search results through a web browser. In another example, a user may input a search query "order movie tickets" through a search engine accessed through a tablet device. The search engine may provide a list of websites that may be tagged as relating to movie tickets. The user may manually explore a movie website that may provide movie information, such as movie reviews, movie show times, and/or a movie ticket ordering service. After discovering the ticket ordering service, the user may provide information requested by the ticket order service in order to complete an order ticket movie action. Unfortunately, completing the order ticket movie action may require locating a particular movie ticketing app or website, extensive manual input, searching, trial and error, and/or input of redundant information.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

Among other things, one or more systems and/or techniques for facilitating task completion through inter-application communication and/or for registering a target application for contextually aware task execution are provided herein. In some embodiments of facilitating task completion, an entity comprised within content of a current application may be identified. The entity may comprise a person entity, a business entity, a consumer product entity, a time entity, a location entity, an object entity, and/or any other types of entities. For example, a social network application may display a social network post comprising content describing a Sports Car Model (X) for 2013, which may be used to identify a car entity (e.g., the content of the social network post may match a car entity definition comprising one or more entity parameters used to define the car entity and/or describe actions that may be performed on the car entity). One or more actions that may be performed on the entity may be exposed. In an example, the social network application may have a view car reviews action embedded within the social network application. In another example, a car quote action may be dynamically identified based upon the car entity (e.g., the car entity definition may reference a car quote action definition comprising one or more action parameters corresponding to information used to perform a car quote action upon the car entity).

Responsive to a selection of an action, a user intent to accomplish a task may be determined based upon an entity context associated with the entity and/or an action context associated with the action. For example, a user intent to perform a car quote action may be determined based upon the car entity (e.g., the car entity definition and/or contextual information about the car entity provided by the social network application, such as a model name and/or model year) and/or the car quote action (e.g., the car quote definition and/or contextual information about the car quote action provided by the social network application, such as a dealer location, car build options, car trade-in information, etc.). One or more target application (e.g., a car trader application) capable of performing the action on the entity may be presented (e.g., through an operating system user interface, such as a share charm).

Responsive to a selection of the target application, the entity context (e.g., the model name and/or model year) and/or the action context (e.g., dealer location, car build options, car trade-in information, etc.) may be passed to the target application so that the target application in launched according to the entity context and/or the action context to facilitate completion of the task. In an example, the car trader application may be opened in a contextually aware state (e.g., a car quote form) that may comprise at least some information extracted from the entity context and/or the action context (e.g., as opposed to merely opening into a non-contextual home screen). In this way, a user may efficiently perform the car quote action through the car trader application with relatively less user input, searching, trial and error, and/or input of redundant information, for example.

In some embodiments of registering a target application for contextually aware task execution, a registration request to establish a data contract with a target application may be received. The registration request may comprise an entity and/or an action supported by the target application. For example, a car enthusiast application may request to establish a data contract between the car enthusiast application and a task execution component, such as an operating system user interface (e.g., a share charm), based upon the car enthusiast application supporting a car entity, a car quote action, and/or other entities and/or actions. In this way, the data contract may be generated with the target application. The data contract may specify that the target application is capable of performing the action on the entity.

An entity definition for the entity may be maintained. The entity definition may comprise one or more entity parameters defining the entity. An entity parameter may specify that the action is capable of being performed on the entity. For example, a car entity definition may comprise a first entity parameter for car model information, a second entity parameter for model year information, a third entity parameter specifying that the car quote action can be performed on the car entity, and/or other entity parameters. An action definition for an action may be maintained. The action definition may comprise one or more action parameters defining the action. An action parameter may specify information used to perform the action. For example, a car quote action definition may comprise a first action parameter for a dealer location information, a second action parameter for car building options information, and/or other action parameters. In this way, the car entity definition and/or the car quote action definition may be used to facilitate performance of a task by a target application based upon contextual information extracted from a current application.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent

DETAILED DESCRIPTION

Figure 1:
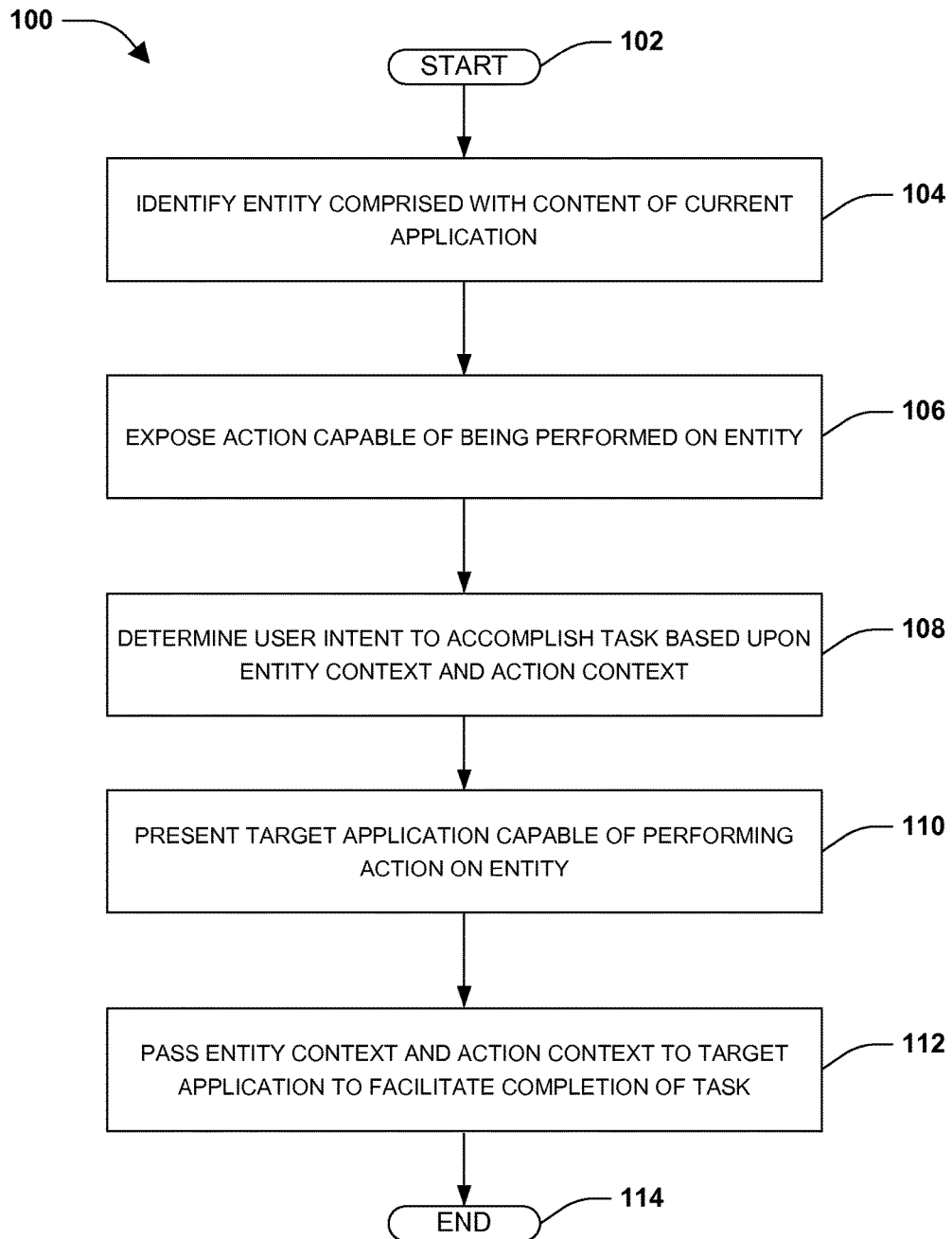
FIG. 1 is a flow diagram illustrating an exemplary method of facilitating task completion through inter-application communication.

The claimed subject matter is now described with reference to the drawings, wherein like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. In other instances, structures and devices are illustrated in block diagram form in order to facilitate describing the claimed subject matter.

An embodiment of facilitating task completion through inter-application communication is illustrated by an exemplary method 100 in FIG. 1. At 102, the method starts. In an example, a user may be interacting with a current application (e.g., a social network application, an email application, a web browser displaying a website, a mapping application, a video game, a locally installed application, a cloud application, etc.). The current application may display content comprising one or more entities. For example, a social network application may display a social network post by a user referencing a particular restaurant, such as Mexican Cantina, that the user enjoyed. In an example, a restaurant entity may be dynamically identified from the content (e.g., the content may be parsed to identify an entity candidate, which may be matched to an entity definition comprising one or more entity parameters defining the entity, such as a restaurant name, a location, a price range, and one or more actions that may be performed on the restaurant entity, such as a reserve table action, a view menu action, etc.). In another example, the restaurant entity may be predefined by the social network application. In this way, an entity comprised within content of a current application may be identified, at 104.

At 106, one or more actions capable of being performed on the entity may be exposed. In an example, a restaurant entity definition may specify one or more actions that may be performed on the restaurant entity, such as the reserve table action. A reserve table action definition may comprise one or more action parameters specifying information used to perform the reserve table action, such as a number of seats, a time, a restaurant name, etc. In this way, an action may be dynamically identified based upon the entity, and may be presented. In another example, the action may be embedded within the current application (e.g., a developer of the current application may embed functionality within the current application that may present the action responsive to a user selecting the entity).

At 108, responsive to a selection of an action (e.g., the reserve table action), a user intent to accomplish a task (e.g., reserve a table at the Mexican Cantina) may be determined based upon an entity context associated with the entity and/or an action context associated with the action. For example, the entity context may comprise values for one or more entity parameters specified within the restaurant entity definition, such as Mexican Cantina as the restaurant name and Downtown as the location. A value for an entity parameter may be extracted from the content of the current application and/or may be extracted from the entity definition. The action context may comprise values for one or more action parameters specified within the reserve table action definition, such as Mexican Cantina as the restaurant name and 8:00 as the time.

One or more target applications capable of performing the action on the entity may be identified. For example, a food expert application may have a data contract with a task execution component. The data contract may specify that the food expert application supports the restaurant entity and/or the reserve table action. In this way, one or more target applications capable of performing the action on the entity may be presented, at 110. In an example, a target application may be presented through the current application. In another example, the target application may be presented through an operating system user interface (e.g., a share charm), which may be displayed relative to the current application (e.g., side-by-side, overlaid, etc.).

Responsive to a selection of a target application (e.g., the food expert application), the entity context and/or the action context may be passed to the target application so that the target application may be launched according to the entity context and/or the action context to facilitate completion of the task, at 112. The target application may comprise a web browser displaying a website, a locally install application, a cloud application or service, and/or a marketplace application available for download and/or install (e.g., the user may be prompted to obtain the marketplace application from an application marketplace). For example, the food expert application, which may be locally installed, may be opened into a contextually relevant state that may comprise at least some information associated with the entity context and/or the action context (e.g., the food expert application may be opened to a table reservation form populated with values from one or more entity parameters and/or one or more action parameters). In an example of passing contextual information to the target application, an operating system communication model may be used to pass the entity context and/or the action context to the target application. In an example, the target application may be launched in an immersive view state (e.g., a substantially full screen state). In another example, the target application may be launched side-by-side with the current application. In another example, the target application may be launched within an overlay interface (e.g., an operating system user interface, such as a charm, used to display applications) that may be displayed side-by-side with the current application. In this way, a user may efficiently complete the task without undue searching for appropriate functionality and/or manual input of redundant information. Once launched, various commands may be performed, such as a back command that may transition display of the target application to the current application and/or to a task interface comprising the one or more target applications that may be selected for task completion.

In an example, an entity action log may be maintained (e.g., a database, a log file, an interactive user interface, etc.). The entity action log may comprise one or more entries comprising information related to task completion, such as usage patterns for actions, engagement patterns for actions, a number of times an action is launched, a number of times an application is launched, etc. An option may be provided for a user opt-in or opt-out to have any such information, activity, actions, etc. logged. An entry may, for example, specify that the action was performed on the entity by the target application. The entity action log may be exposed to a third party application (e.g., a developer of a travel application). A data contract between a task completion component and the third party application may be generated (e.g., the developer may send a registration request indicating a desire to generate the data contract). The data contract may specify that the third party application supports performance of the action on the entity. In this way, a third party application may register as a target application for contextually aware task execution. At 114, the method ends.

Figure 2:
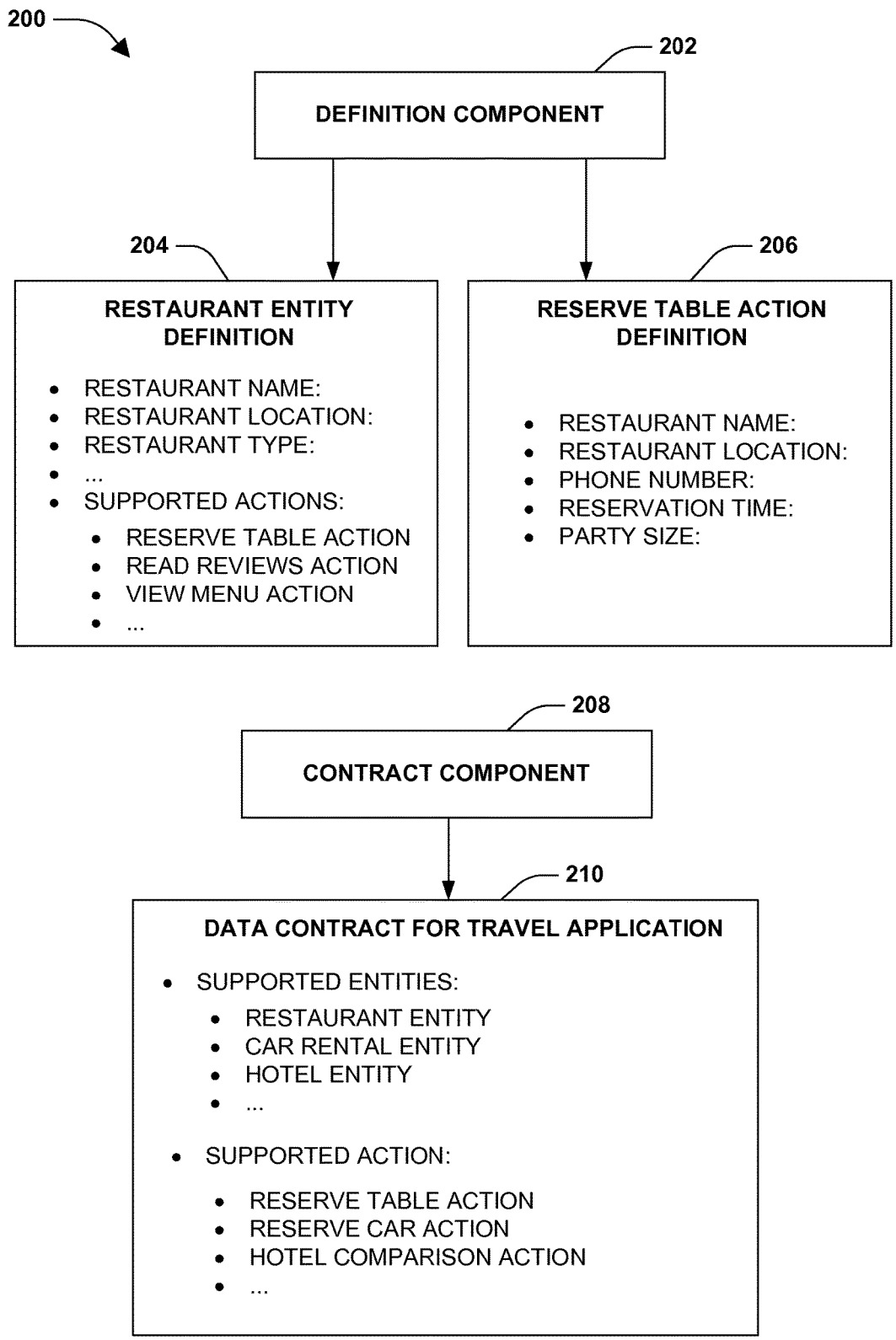
FIG. 2 is a component block diagram illustrating an exemplary system for maintaining an entity definition for an entity, an action definition for an action, and/or a data contract associated with a target application.

FIG. 2 illustrates an example of a system 200 configured for maintaining an entity definition for an entity, an action definition for an action, and/or a data contract associated with a target application. The system 200 may comprise a definition component 202 and/or a contract component 208. The definition component 202 may be configured to generate an entity definition for an entity. For example, the definition component 202 may maintain a restaurant entity definition 204 for a restaurant entity. The restaurant entity definition 204 may comprise one or more entity parameters defining the entity and/or specifying actions that may be performed on the entity. For example, a restaurant name parameter, a restaurant location parameter, a restaurant type parameter, and/or other entity parameters may be specified within the restaurant entity definition 204. In an example, an instance of a restaurant entity, such as a Mexican Cantina entity, may be defined based upon populating the restaurant entity definition with values for one or more of the entity parameters (e.g., Mexican Cantina as the restaurant name, Downtown as the restaurant location, etc.). One or more supported actions, such as a reserve table action, a read reviews action, a view menu action, and/or other actions that may be performed on the restaurant entity, may be specified within the restaurant entity definition 204. The restaurant entity definition 204 may be used to generate an entity context for the restaurant entity in order to facilitate task completion (e.g., the entity context may comprise at least some information specified within the restaurant entity definition 204, which may be passed to a target application so that the target application may be launched into a contextually relevant state for task completion).

The definition component 202 may be configured to generate an action definition for an action. For example, the definition component 202 may maintain a reserve table action definition 206 for the reserve table action. The reserve table action definition 206 may comprise one or more action parameters defining the action and/or specifying information used to perform the action. For example, the reserve table action definition 206 may comprise a restaurant name parameter, a restaurant location parameter, a phone number parameter, a reservation time parameter, a party size parameter, and/or other action parameters used to perform the reserve table action. The reserve table action definition 206 may be used to generate an action context for the reserve table action in order to facilitate task completion (e.g., the action context may comprise at least some information specified within the reserve table action definition 206, which may be passed to a target application so that the target application may be launched into a contextually relevant state for task completion).

The contract component 208 may be configured to maintain one or more data contracts between a task execution component (e.g., configured to facilitate completion of a task through inter-application communication) and one or more third party applications. For example, the contract component 208 may generate a data contract 210 for a travel application. The data contract 210 may specify that the travel application supports one or more entities (e.g., a restaurant entity, a car rental entity, a hotel entity, etc.) and/or one or more actions (e.g., a reserve table action, a reserve car action, a hotel comparison action, etc.). In this way, the travel application 210 may be identified as a target application capable of performing an action on an entity in order to facilitate task completion.

Figure 3A:
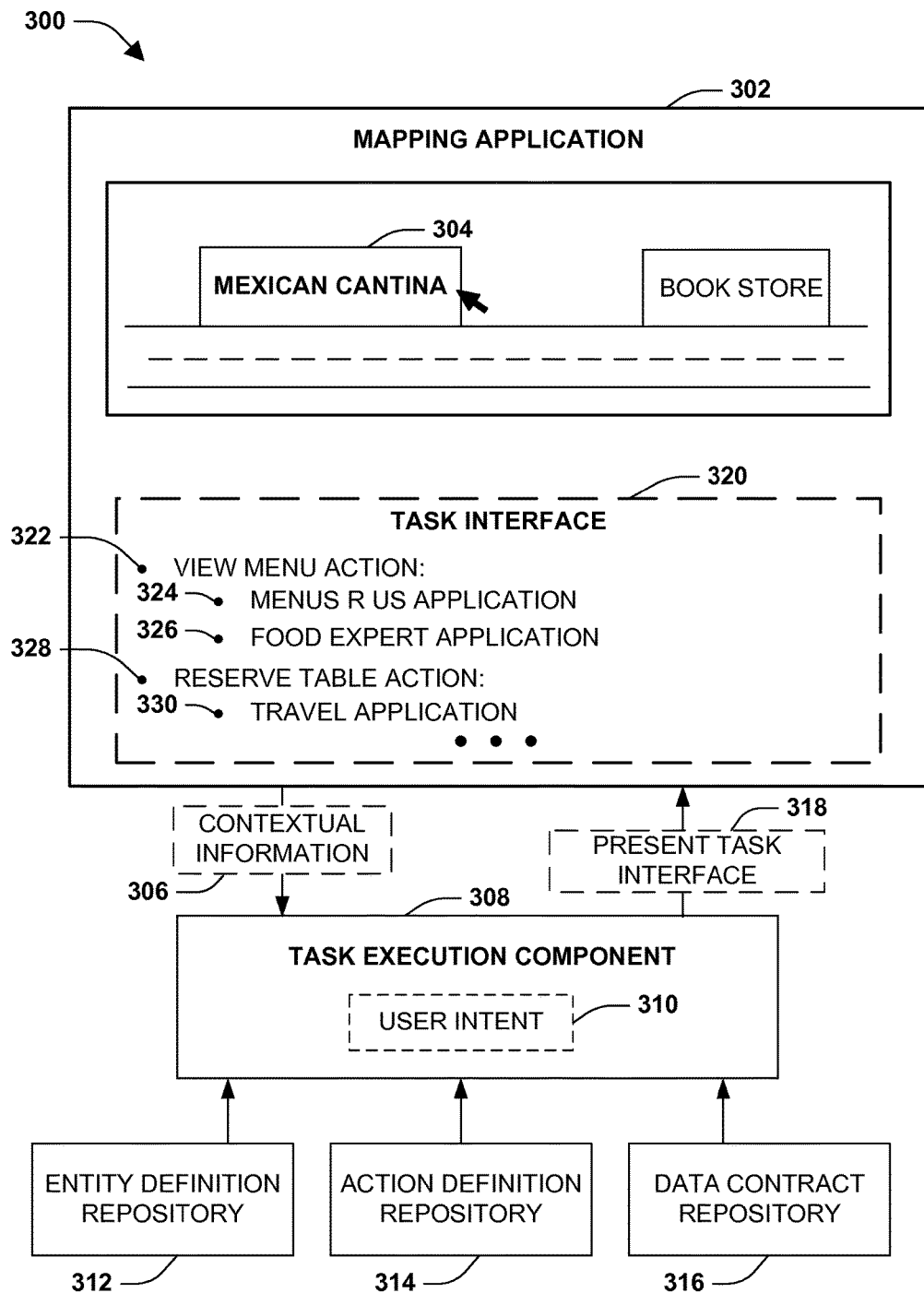
FIG. 3A is a component block diagram illustrating an exemplary system for facilitating task completion through inter-application communication.

FIG. 3A illustrates an example of a system 300 configured for facilitating task completion through inter-application communication. The system 300 may comprise a task execution component 308 (e.g., a programming module, a web service, application functionality, and/or an operating system user interface, such as a share charm, for example). The task execution component 308 may be associated with a current application, such as a mapping application 302. The mapping application 302 may provide content to a user (e.g., a local map illustrating a Mexican Cantina 304 and a Book Store within Downtown). The task execution component 308 may be configured to identify an entity, such as a Mexican Cantina entity, comprised within the content of the mapping application 302. For example, the task execution component 308 may use contextual information 306 associated with the content of the mapping application 302 in order to identify a restaurant entity definition within an entity definition repository 312 that may be used to define the Mexican Cantina entity. The task execution component 308 may expose one or more actions capable of being performed on the Mexican Cantina entity. For example, the task execution component 308 may present 318 a view menu action 322 and/or a reserve table action 328 through a task interface 320. In an example, an action may be embedded into the mapping application 302 (e.g., predefined by a developer). In another example, an action may be dynamically identified based upon an action definition within an action definition repository 314 (e.g., a view menu action definition, a reserve table action definition, etc.).

The task execution component 308 may be configured to identify a selection of an action. In an example, a user may select the view menu action 322. The task execution component 308 may be configured to determine a user intent 310 to accomplish a task based upon an entity context associated with the entity and/or an action context associated with the action. For example, the user intent 310 may indicate that the user desires to view a menu for the Mexican Cantina 304 based upon the entity context (e.g., contextual information associated with the Mexican Cantina entity, which may have been derived from the contextual information 306 associated with the content of the mapping application 302 and/or derived from the restaurant entity definition from the entity definition repository 312) and/or the action context (e.g., contextual information associated with the view menu action, which may have been derived from the contextual information 306 associated with the content of the mapping application 302 and/or derived from the view menu action definition from the action definition repository 314). One or more target applications, such as a menus r us application 324 and/or a food expert application 326, capable of performing the action on the entity may be presented (e.g., present 318 through the task interface 320, such as a user interface within the mapping application 302 or an external user interface, such as an operating system user interface). For example, the menus r us application 324 and/or the food expert application 326 may have data contracts within a data contract repository 316, which may specify that such applications support the Mexican Cantina entity and/or the view menu action 324. In another example where the reserve table action 328 is selected, a travel application 330 may be presented through the task interface 320 based upon a data contract between the travel application 330 and the task execution component 308 indicating that the Mexican Cantina entity and the reserve table action 328 are supported by the travel application 330. In this way, a user may select a target application, which may be launched in a contextually relevant state for task completion (e.g., as illustrated in FIG. 3B).

Figure 3B:
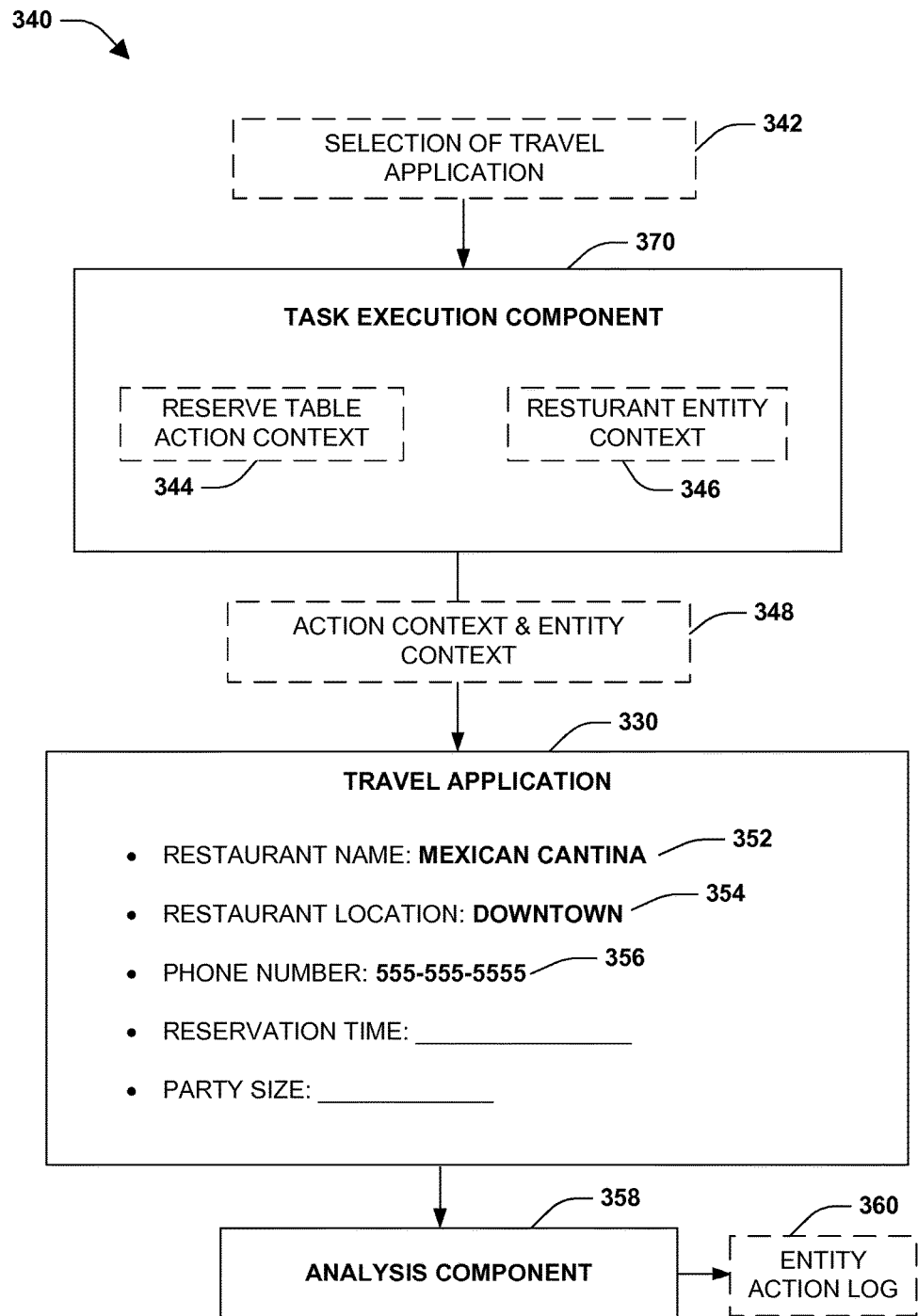
FIG. 3B is a component block diagram illustrating an exemplary system for facilitating task completion through inter-application communication.

FIG. 3B illustrates an example of a system 340 configured for facilitating task completion through inter-application communication. It may be appreciated that in an example, the system 340 corresponds to the system 300 of FIG. 3A. For example, the system 340 may comprise a task execution component 370. The task execution component 370 may be associated with a current application, such as a mapping application (e.g., 302 of FIG. 3A). Based upon an entity, such as a Mexican Cantina entity, occurring within content of the mapping application, a task interface (e.g., 320 of FIG. 3A) comprising one or more actions that may be performed on the Mexican Cantina entity and/or one or more applications capable of performing an action on the Mexican Cantina entity may have been presented.

The task execution component 370 may be configured to receive a selection 342 of an application, such as a travel application 330 associated with a reserve table action (e.g., 328 of FIG. 3A) for the Mexican Cantina entity (e.g., a user may have selected the travel application 330 within the task interface 320 of FIG. 3A). The task execution component 370 may identify a reserve table action context 344 based upon contextual information (e.g., 306 of FIG. 3A) from the mapping application (e.g., 302 of FIG. 3A) and/or from a reserve table action definition comprising one or more action parameters corresponding to information used to perform the reserve table action (e.g., 328 of FIG. 3A). The reservation table action content 344 may comprise information used to perform the reserve table action, such as a restaurant name, a restaurant location, a party size, etc. The task execution component 370 may identify a restaurant entity context 346 defining the Mexican Cantina entity based upon contextual information (e.g., 306 of FIG. 3A) from the mapping application (e.g., 302 of FIG. 3A) and/or from a restaurant entity definition comprising one or more entity parameters corresponding to information describing the Mexican Cantina entity.

The task execution component 370 may pass 348 (e.g., utilizing an operating system communication model) the reserve table action context 344 and/or the restaurant entity context 346 to the travel application 330 so that the travel application 330 may be launched according to the reserve table action context 344 and/or the restaurant entity context 346. For example, the travel application 330 may be opened into a table reservation form, which may be populated with at least some information from the reserve table action context 344 and/or the restaurant entity context 346, such as Mexican Cantina as a restaurant name 352, Downtown as a restaurant location 354, and/or 555-555-5555 as a phone number 356. In an example, the travel application 330 may be launched in an immersive view state (e.g., full screen, etc.). In another example, the travel application 330 may be launched within an overlay interface (e.g., an operating system user interface, such as a share charm) displayed side-by-side with the current application. In this way, the user may efficiently reserve a table at the Mexican Cantina without undue searching for appropriate functionality and/or manual input of redundant information, for example.

In an example, the system 340 may comprise an analysis component 358. The analysis component 358 may be configured to maintain an entity action log 360. The analysis component 358 may generate an entry within the entity action log 360 based upon the launch of the travel application 330. For example, the entry may specify that the action was performed on the entity by the target application in order to complete the task (e.g., the travel application 330 performed the reserve table action on the Mexican Cantina entity). The entity action log 360 may comprise a variety of information and/or metrics, such as a number of times an action is selected, a number of times an application is launched to perform the action, etc. The entity action log 360 may be exposed to a third party application (e.g., a developer of the third party application), which may register with the task execution component 370 to create a data contract that may allow the third party application to be used as a target application for contextually aware task completion.

Figure 4A:
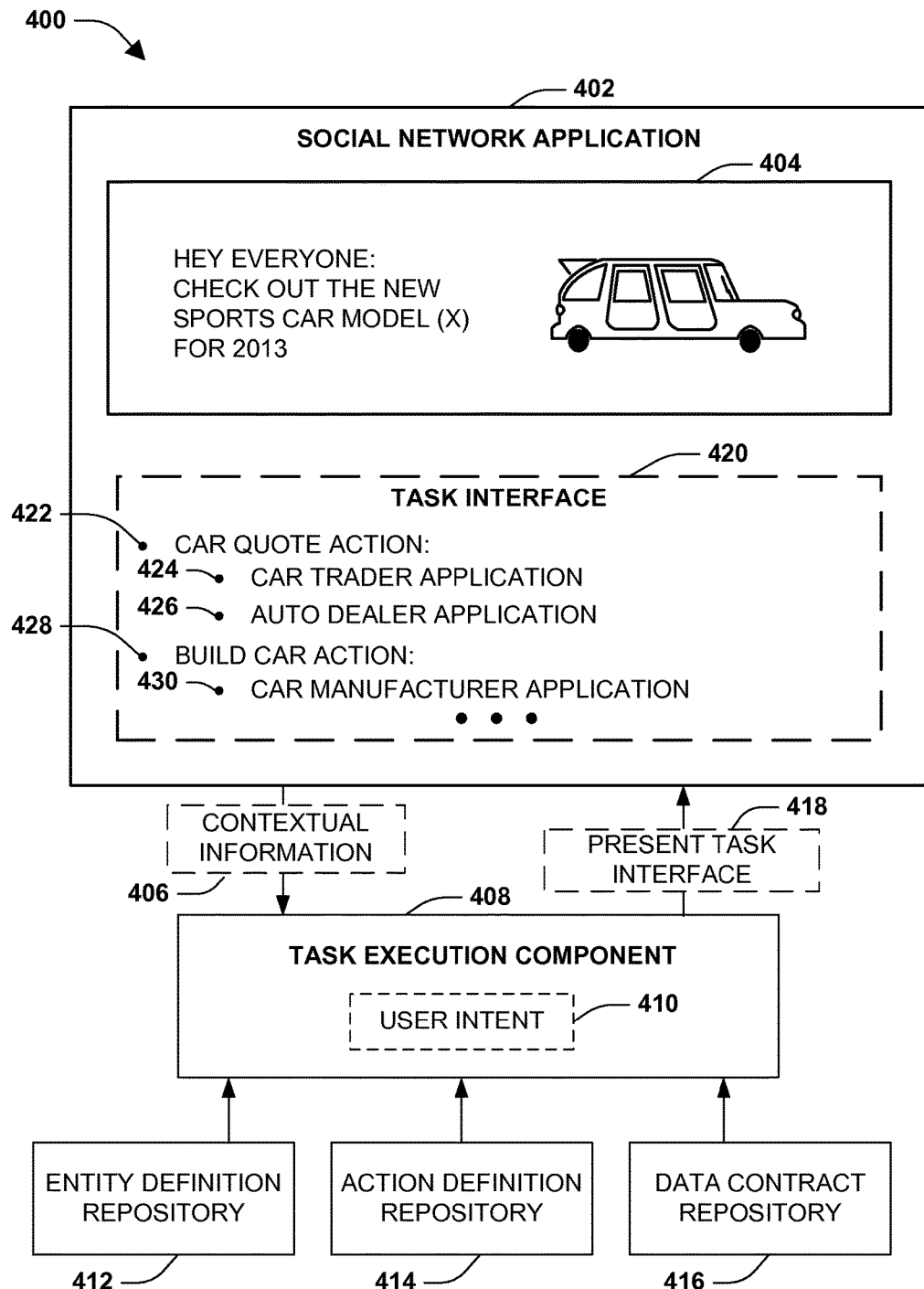
FIG. 4A is a component block diagram illustrating an exemplary system for facilitating task completion through inter-application communication.

FIG. 4A illustrates an example of a system 400 configured for facilitating task completion through inter-application communication. The system 400 may comprise a task execution component 408 (e.g., a programming module, web service, application functionality, and/or an operating system user interface, such as a share charm). The task execution component 408 may be associated with a current application, such as a social network application 402. The social network application 402 may present content to a user (e.g., a social network post by a user about a Sports Car Model (X) for 2013). The task execution component 408 may be configured to identify an entity, such as a Sports Car Model (X) entity, comprised within the content of the social network application 402. For example, the task execution component 408 may use contextual information 406 associated with the content of the social network application 402 in order to identify a car entity definition within an entity definition repository 412 that may be used to define the Sports Car Model (X) entity. The task execution component 408 may expose one or more actions capable of being performed on the Sports Car Model (X) entity. For example, the task execution component 408 may present 418 a car quote action 422 and/or a build car action 428 through a task interface 420. In an example, an action may be embedded into the social network application 402 (e.g., predefined by a developer). In another example, an action may be dynamically identified based upon an action definition within an action definition repository 414 (e.g., a car quote action definition, a build car action definition, etc.).

The task execution component 408 may be configured to identify a selection of an action. In an example, a user may select the car quote action 422. The task execution component 408 may be configured to determine a user intent 410 to accomplish a task based upon an entity context associated with the entity and/or an action context associated with the action. For example, the user intent 410 may indicate that the user desires obtain a car quote for the Sports Car Model (X) entity based upon the entity context (e.g., contextual information associated with the Sports Car Model (X) entity, which may have been derived from the contextual information 406 associated with the content of the social network application 402 and/or derived from the car entity definition from the entity definition repository 412) and/or the action context (e.g., contextual information associated with the car quote action 422, which may have been derived from the contextual information 406 associated with the content of the social network application 402 and/or derived from the car quote action definition from the action definition repository 414). One or more target applications, such as a car trader application 424 and/or a auto dealer application 426, capable of performing the action on the entity may be presented (e.g., present 418 through the task interface 420, such as a user interface within the social network application 402 or an external user interface, such as an operating system user interface). For example, the car trader application 424 and/or the auto dealer application 426 may have data contracts within a data contract repository 416, which may specify that such applications support the Sports Car Model (X) entity and/or the car quote action 422. In another example where the build car action 428 is selected, a car manufacturer application 430 may be presented through the task interface 420 based upon a data contract between the car manufacturer application 430 and the task execution component 408 indicating that the Sports Car Model (X) entity and the build car action 428 are supported by the car manufacturer application 430. In this way, a user may select a target application, which may be launched in a contextually relevant state for task completion (e.g., as illustrated in FIG. 4B).

Figure 4B:
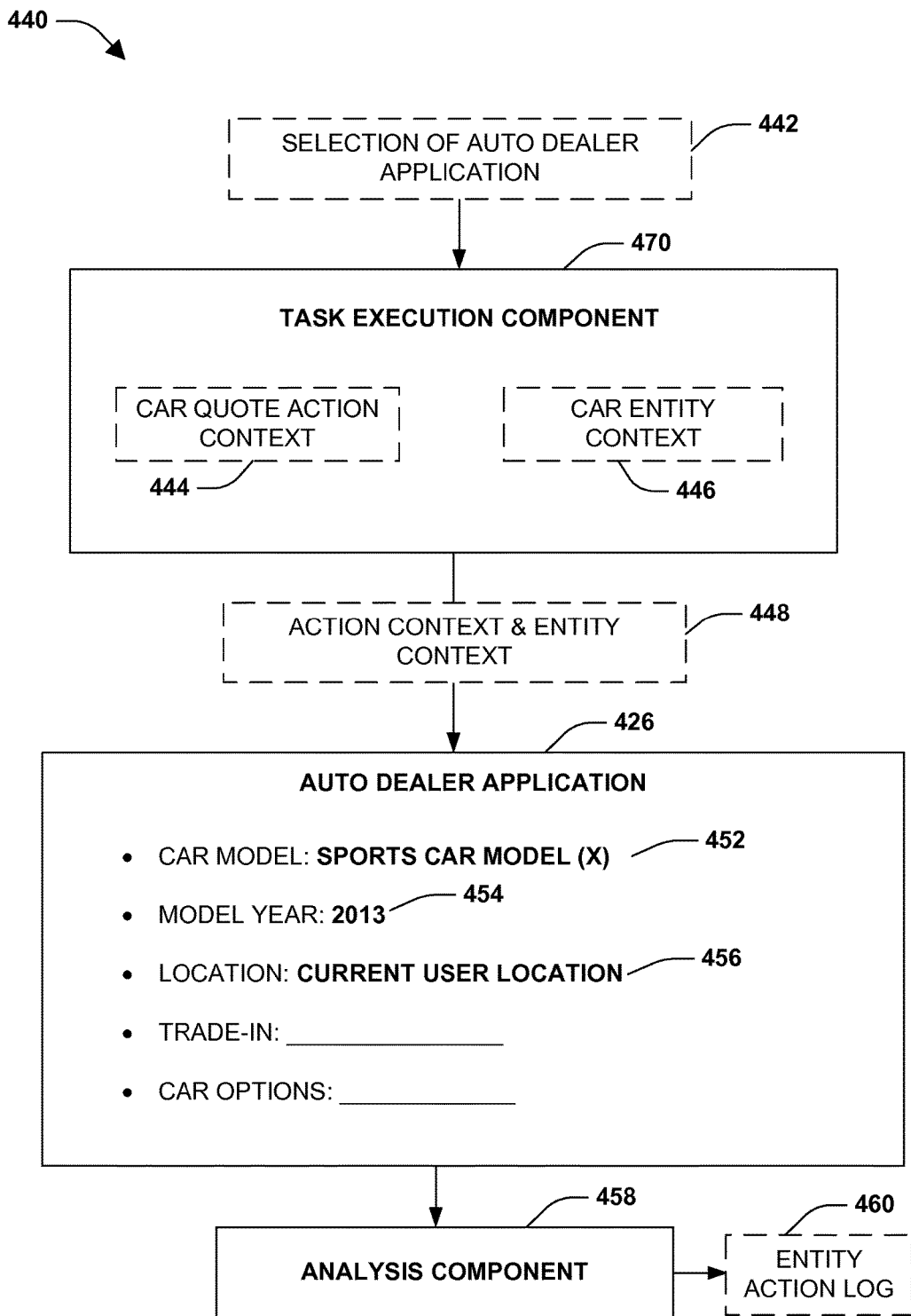
FIG. 4B is a component block diagram illustrating an exemplary system for facilitating task completion through inter-application communication.

FIG. 4B illustrates an example of a system 440 configured for facilitating task completion through inter-application communication. It may be appreciated that in an example, the system 440 corresponds to the system 400 of FIG. 4A. For example, the system 440 may comprise a task execution component 470. The task execution component 470 may be associated with a current application, such as a social network application (e.g., 402 of FIG. 4A). Based upon an entity, such as a Sports Car Model (X) entity, occurring within content of the social network application (e.g., 402 of FIG. 4A), a task interface (e.g., 420 of FIG. 4A) comprising one or more actions that may be performed on the Sports Car Model (X) entity and/or one or more applications capable of performing an action on the Sports Car Model (X) entity, may have been presented.

The task execution component 470 may be configured to receive a selection 442 of an application, such as an auto dealer application 426 associated with a car quote action (e.g., 422 of FIG. 4A) for the Sports Car Model (X) entity (e.g., a user may have selected the auto dealer application 426 within the task interface 420 of FIG. 4A). The task execution component 470 may identify a car quote action context 444 based upon contextual information (e.g., 406 of FIG. 4A) from the social network application (e.g., 402 of FIG. 4A) and/or from a car quote action definition comprising one or more action parameters corresponding to information used to perform the car quote action (e.g., 422 of FIG. 4A). The car quote action content 444 may comprise information used to perform the car quote action, such as a car model, a model year, a location, trade-in information, car options, etc. The task execution component 470 may identify a car entity context 446 defining the Sports Car Model (X) entity based upon contextual information (e.g., 406 of FIG. 4A) from the social network application (e.g., 402 of FIG. 4A) and/or from a car entity definition comprising one or more entity parameters corresponding to information describing the Sports Car Model (X) entity.

The task execution component 470 may pass 448 (e.g., utilizing an operating system communication model) the car quote action context 444 and/or the car entity context 446 to the auto dealer application 426 so that the auto dealer application 426 may be launched according to the car quote action context 444 and/or the car entity context 446. For example, the auto dealer application 426 may be opened into a car quote form, which may be populated with at least some information from the car quote action context 444 and/or the car entity context 446, such as Sports Car Model (X) as a car model 452, 2013 as a model year 454, and/or a current user location as a location 456 (e.g., supplemental data associated with a user device hosting the auto dealer application, such as a current (e.g., GPS) location of the user device, may be used as a value to populate the car quote form). In an example, the auto dealer application 426 may be launched in an immersive view state (e.g., full screen, etc.). In another example, the auto dealer application 426 may be launched within an overlay interface (e.g., an operating system user interface, such as a share charm) displayed side-by-side with the current application. In this way, the user may efficiently obtain a car quote for the Sports Car Model (X) without undue searching for appropriate functionality and/or manual input of redundant information, for example.

In an example, the system 440 may comprise an analysis component 458. The analysis component 458 may be configured to maintain an entity action log 460. The analysis component 458 may generate an entry within the entity action log 460 based upon the launch of the auto dealer application 426. For example, the entry may specify that the action was performed on the entity by the target application in order to complete the task (e.g., the auto dealer application 426 performed the car quote action for the Sports Car Model (X) entity). The entity action log 460 may comprise a variety of information and/or metrics, such as a number of times an action is selected, a number of times an application is launched to perform the action, etc. The entity action log 460 may be exposed to a third party application (e.g., a developer of the third party application), which may register with the task execution component 470 to create a data contract that may allow the third party application to be used as a target application for contextually aware task completion.

Figure 5:
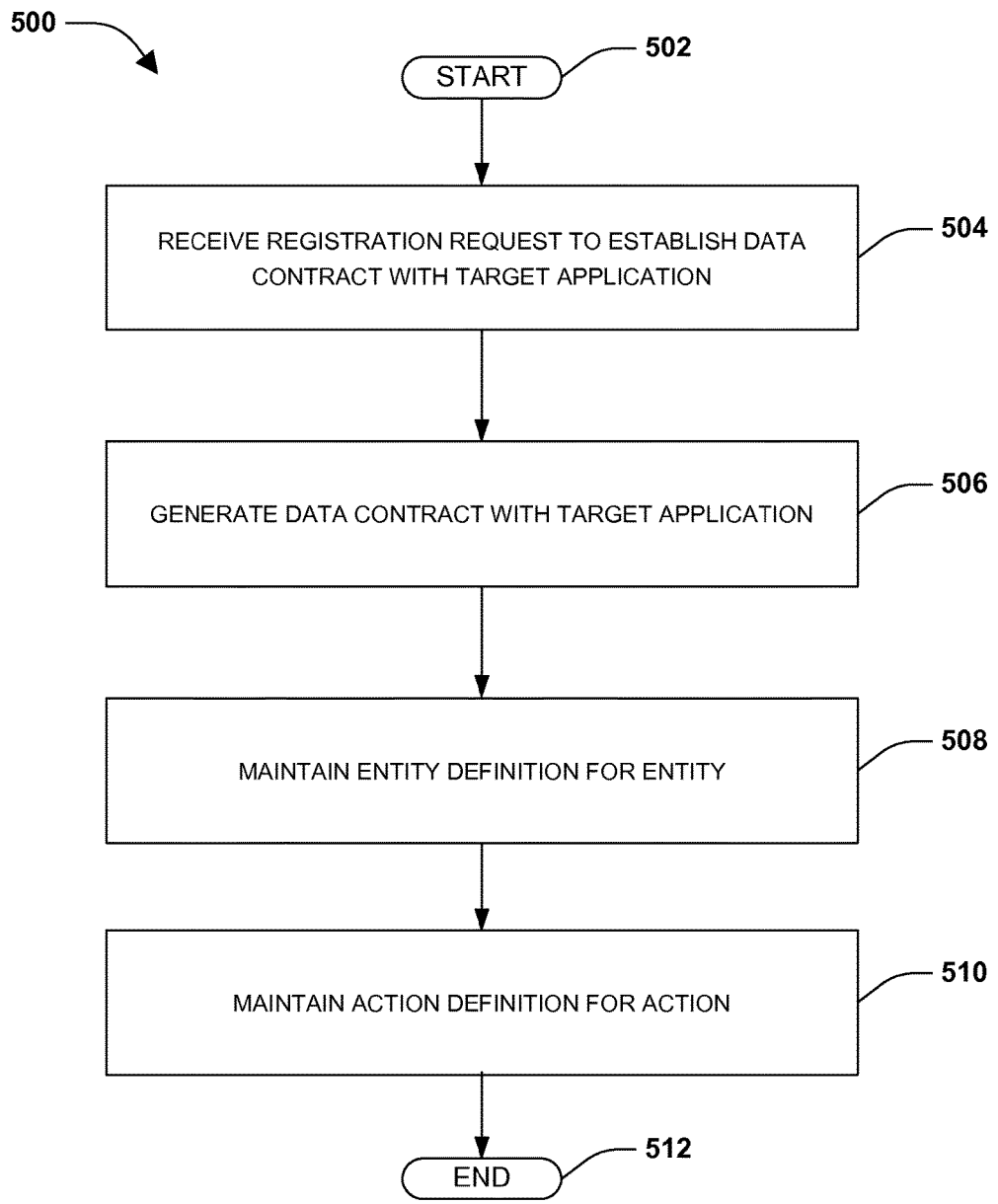
FIG. 5 is a flow diagram illustrating an exemplary method of registering a target application for contextually aware task execution.

An embodiment of registering a target application for contextually aware task execution is illustrated by an exemplary method 500 in FIG. 5. At 502, the method starts. At 504, a registration request to establish a data contract with a target application may be received (e.g., a data contract between the target application and a task execution component that is configured to launch target applications into contextually relevant states in order to facilitate task completion). The registration request may comprise an entity and/or an action supported by the target application (e.g., an action that may be performed on the entity by a dining application). At 506, the data contract with the target application is generated. The data contract may specify that the target application is capable of performing the action on the entity.

At 508, an entity definition for the entity may be maintained. The entity definition may comprise one or more entity parameters defining the entity (e.g., a restaurant entity definition may comprise a restaurant name parameter, a location parameter, a price rating parameter, etc.). For example, an entity parameter may specify that an action is capable of being performed on the entity (e.g., a reserve table action may be performed on a restaurant entity). At 510, an action definition for the action may be maintained. The action definition may comprise one or more action parameters defining the action. For example, an action parameter may specify information used to perform the action (e.g., a restaurant location for the table reservation action). In this way, the data contract, the entity definition, and/or the action definition may be used to identify the entity, the action that may be performed on the entity, and/or the target application capable of performing the action on the entity.

In an example, the entity, such as the restaurant entity, may be identified within content of a current application, such as a mapping application. Values for at least one entity parameter within the entity definition may be specified based upon contextual information of the entity derived from the current application to generate an entity context. For example, Mexican Cantina (e.g., extracted from the content of the mapping application) may be specified as a value for a restaurant name entity parameter within the restaurant entity definition. The action, such as the reserve table action, capable of being performed on the entity may be exposed. Responsive to selection of the action, values for at least one action parameter within the action definition may be specified based upon contextual information derived from the current application to generate an action context. For example, Downtown (e.g., derived from a current location displayed within the mapping application) may be specified as a value for a location action parameter within the reserve table action definition. The target application, such as the dinning application, capable of performing the action on the entity may be presented. Responsive to selection of the target application, the entity context and/or the action context may be passed to the target application so that the target application may be launched according to the entity context and/or the action context to complete a task (e.g., the dinning application may be launched into a contextually relevant reservation form). At 512, the method ends. It may be appreciated that variations to the disclosed subject matter are envisioned. For example, 508 and/or 510 or FIG. 5 may be optional in some embodiments.

Figure 6:
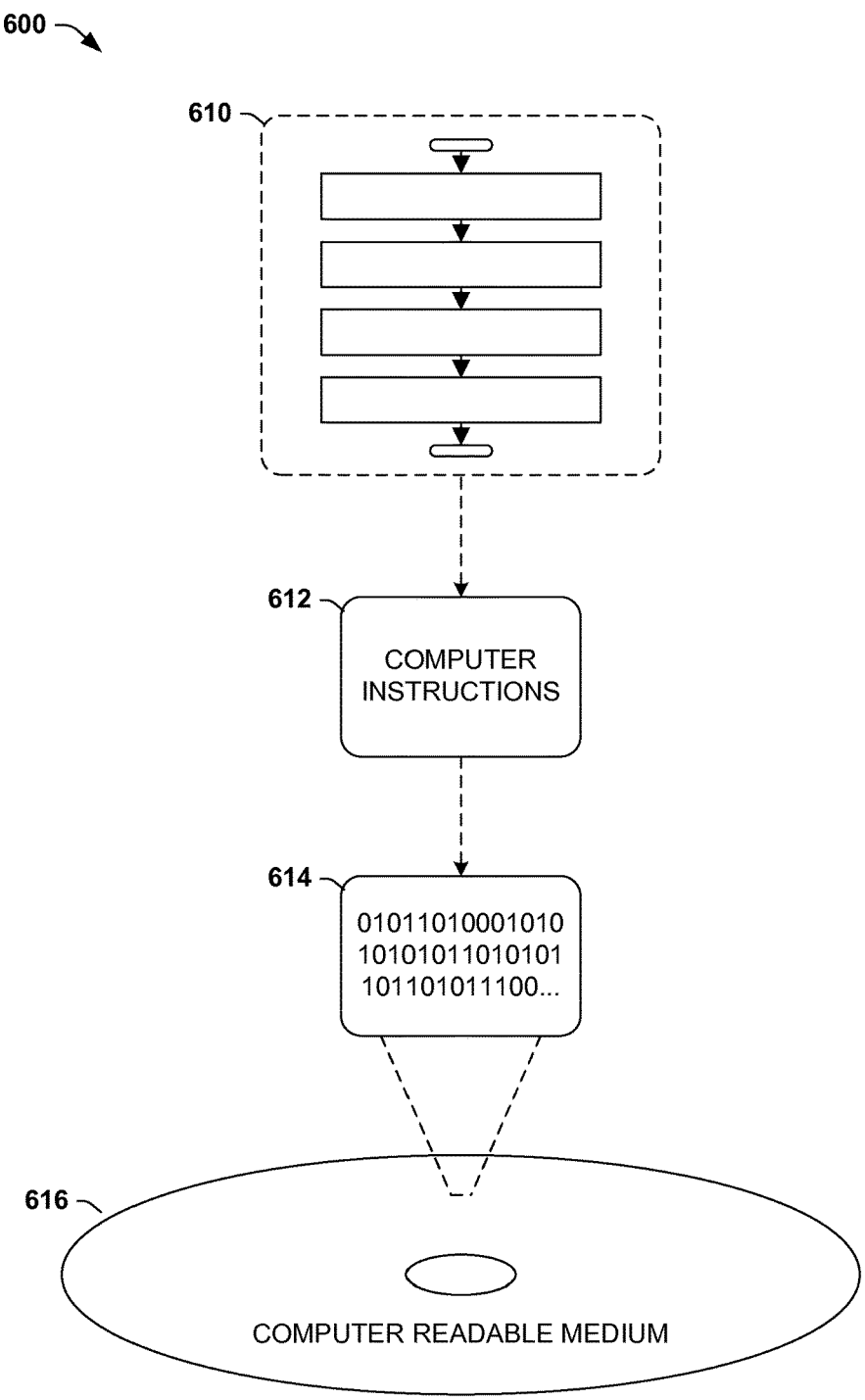
FIG. 6 is an illustration of an exemplary computing device-readable medium wherein processor-executable instructions configured to embody one or more of the provisions set forth herein may be comprised.

Still another embodiment involves a computer-readable medium comprising processor-executable instructions configured to implement one or more of the techniques presented herein. An exemplary computer-readable medium that may be devised in these ways is illustrated in FIG. 6, wherein the implementation 600 comprises a computer-readable medium 616 (e.g., a CD-R, DVD-R, or a platter of a hard disk drive), on which is encoded computer-readable data 614. This computer-readable data 614 in turn comprises a set of computer instructions 612 configured to operate according to one or more of the principles set forth herein. In one such embodiment 600, the processor-executable computer instructions 612 may be configured to perform a method 610, such as at least some of the exemplary method 100 of FIG. 1 and/or at least some of the exemplary method 500 of FIG. 5, for example. In another such embodiment, the processor-executable instructions 612 may be configured to implement a system, such as at least some of the exemplary system 200 of FIG. 2, at least some of the exemplary system 300 of FIG. 3A, at least some of the exemplary system 340 of FIG. 3B, at least some of the exemplary system 400 of FIG. 4A, and/or at least some of the exemplary system 440 of FIG. 4B, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 7:
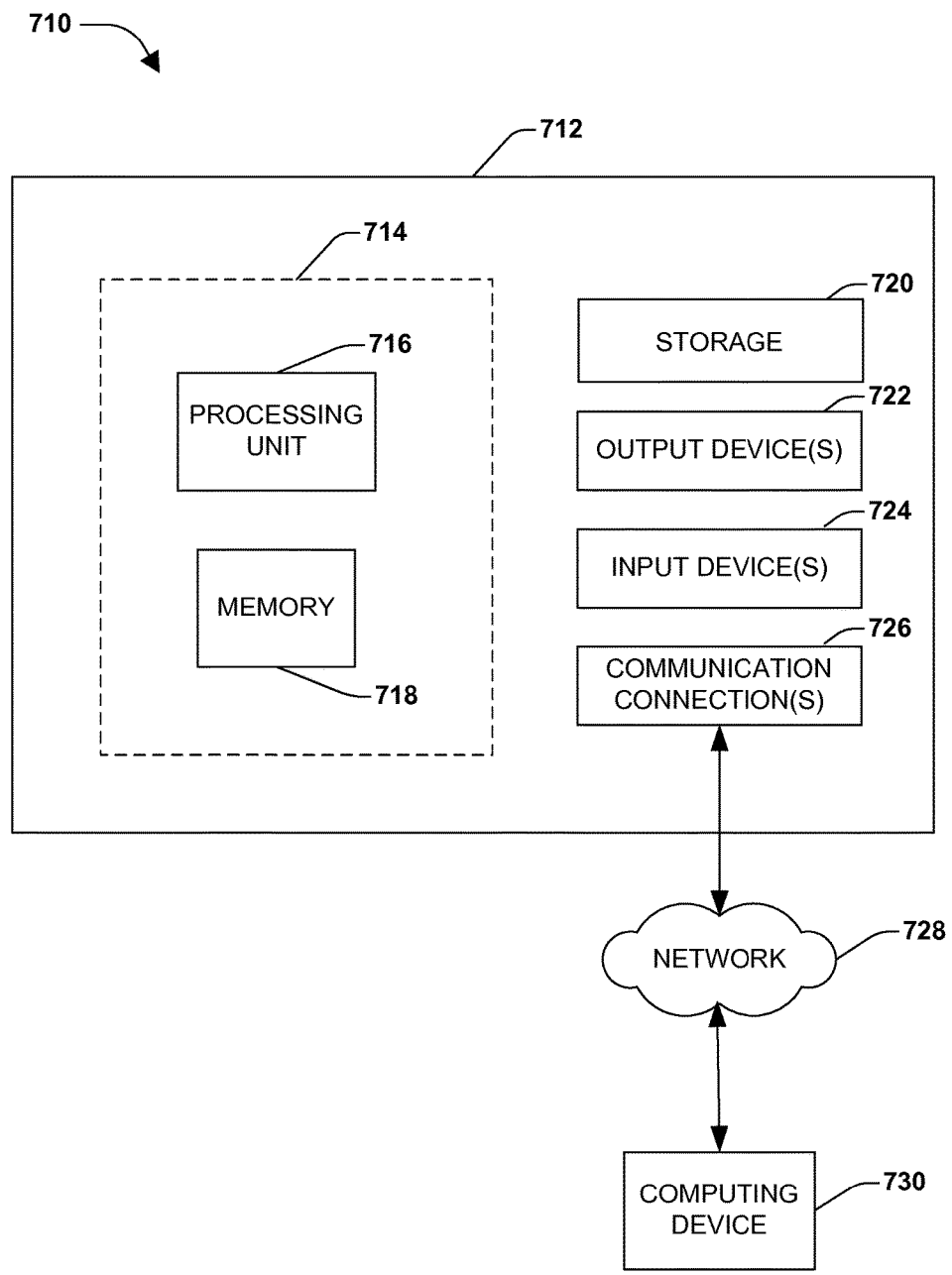
FIG. 7 illustrates an exemplary computing environment wherein one or more of the provisions set forth herein may be implemented.

FIG. 7 and the following discussion provide a brief, general description of a suitable computing environment to implement embodiments of one or more of the provisions set forth herein. The operating environment of FIG. 7 is only an example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 7 illustrates an example of a system 710 comprising a computing device 712 configured to implement one or more embodiments provided herein. In one configuration, computing device 712 includes at least one processing unit 716 and memory 718. Depending on the exact configuration and type of computing device, memory 718 may be volatile (such as RAM, for example), non-volatile (such as ROM, flash memory, etc., for example) or some combination of the two. This configuration is illustrated in FIG. 7 by dashed line 714.

In other embodiments, device 712 may include additional features and/or functionality. For example, device 712 may also include additional storage (e.g., removable and/or non-removable) including, but not limited to, magnetic storage, optical storage, and the like. Such additional storage is illustrated in FIG. 7 by storage 720. In an embodiment, computer readable instructions to implement one or more embodiments provided herein may be in storage 720. Storage 720 may also store other computer readable instructions to implement an operating system, an application program, and the like. Computer readable instructions may be loaded in memory 718 for execution by processing unit 716, for example.

The term "computer readable media" as used herein includes computer storage media. Computer storage media includes volatile and nonvolatile, removable and non-removable media implemented in any method or technology for storage of information such as computer readable instructions or other data. Memory 718 and storage 720 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 712. Any such computer storage media may be part of device 712.

Device 712 may also include communication connection(s) 726 that allows device 712 to communicate with other devices. Communication connection(s) 726 may include, but is not limited to, a modem, a Network Interface Card (NIC), an integrated network interface, a radio frequency transmitter/receiver, an infrared port, a USB connection, or other interfaces for connecting computing device 712 to other computing devices. Communication connection(s) 726 may include a wired connection or a wireless connection. Communication connection(s) 726 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 712 may include input device(s) 724 such as keyboard, mouse, pen, voice input device, touch input device, infrared cameras, video input devices, and/or any other input device. Output device(s) 722 such as one or more displays, speakers, printers, and/or any other output device may also be included in device 712. Input device(s) 724 and output device(s) 722 may be connected to device 712 via a wired connection, wireless connection, or any combination thereof. In an embodiment, an input device or an output device from another computing device may be used as input device(s) 724 or output device(s) 722 for computing device 712.

Components of computing device 712 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 712 may be interconnected by a network. For example, memory 718 may be comprised of multiple physical memory units located in different physical locations interconnected by a network.

Those skilled in the art will realize that storage devices utilized to store computer readable instructions may be distributed across a network. For example, a computing device 730 accessible via a network 728 may store computer readable instructions to implement one or more embodiments provided herein. Computing device 712 may access computing device 730 and download a part or all of the computer readable instructions for execution. Alternatively, computing device 712 may download pieces of the computer readable instructions, as needed, or some instructions may be executed at computing device 712 and some at computing device 730.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form. Also, at least one of A and B and/or the like generally means A or B or both A and B.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A system for facilitating task completion through inter-application communication, comprising:
one or more processing units; and
memory comprising instructions that when executed by at least one of the one or more processing units implement a task execution component configured to:
identify an entity comprised within content of a first application, wherein the entity is identified based on a business name and a business location, and wherein the entity is a first business entity or a second business entity;
expose an action capable of being performed on the entity, wherein the exposed action is different based on whether the entity is the first business entity or the second business entity;
receive a selection of the action;
identify a target application capable of performing the action on the entity;
cause presentation of the identified target application;
receive a selection of the identified target application;
in response to receiving the selection of the identified target application, pass entity context information and action context information from the first application to the selected target application;
cause display of the selected target application; and
maintain a metrics log comprising analysis data including a number of times the identified target application is selected.

2. The system of claim 1, the task execution component comprising an operating system user interface, wherein the operating system user interface further comprises a share charm.

3. The system of claim 1, wherein the executed instructions causing the task execution component to be configured to determine a user intent to accomplish a task based upon the entity context information associated with the entity and the action context information associated with the action.

4. The system of claim 1, the action embedded within the first application.

5. The system of claim 1, the task execution component configured to:
dynamically identify the action based upon the entity; and
cause display of the action.

6. The system of claim 1, at least one of the first application or the selected target application comprising at least one of a web browser, a marketplace application available for download, a cloud application, or a locally installed application.

7. The system of claim 1, the task execution component configured to:
determine that the selected target application is capable of performing the action on the entity based upon a data contract between the task execution component and the selected target application specifying that the selected target application supports the action and the entity.

8. The system of claim 1, the task execution component configured to:
cause the selected target application to launch within an overlay interface displayed side-by-side with the first application.

9. The system of claim 1, the task execution component configured to:
utilize an operating system communication model to pass the entity context information and the action context information to the selected target application.

10. The system of claim 1, the instructions when executed implement an analysis component configured to:
generate an entry within an entity action log, the entry specifying that the action was performed on the entity by the selected target application; and
expose the entity action log to a third party application.

11. The system of claim 1, the instructions when executed implement a contract component configured to:
generate a data contract specifying that a third party application supports performance of the action on the entity.

12. The system of claim 1, the task execution component configured to:
receive a back command associated with the selected target application; and
cause transition of the display of the selected target application to at least one of the first application or a task interface comprising the identified target application.

13. The system of claim 1, the task execution component configured to:
cause display of the identified target application based upon the identified target application having two data contracts, the two data contracts comprising a first data contract specifying support for the action and a second data contract specifying support for the entity.

14. The system of claim 1, the instructions when executed implement a definition component configured to:
generate an entity definition for the entity used to generate the entity context information, the entity definition comprising one or more entity parameters defining the entity, an entity parameter specifying that the action is capable of being performed on the entity; and
generate an action definition for the action used to generate the action context information, the action definition comprising one or more action parameters defining the action, an action parameter specifying information used to perform the action.

15. A method for facilitating task completion through inter-application communication, comprising:
identifying an entity comprised within content of a first application, wherein the entity is identified based on a business name and a business location, and wherein the entity is a first business entity or a second business entity;
exposing an action capable of being performed on the entity, wherein the exposed action is different based on whether the entity is the first business entity or the second business entity;
receiving a selection of the action;
identifying a target application capable of performing the action on the entity;

causing a presenting of the identified target application;
receiving a selection of the identified target application;
in response to receiving the selection of the identified target application, passing entity context information associated with the entity and action context information associated with the action from the first application to the selected target application;
causing a displaying of the selected target application; and
maintaining a metrics log comprising analysis data including a number of times the identified target application is selected.

16. The method of claim 15, the presenting comprising:
determining that the selected target application is capable of performing the action on the entity based upon a data contract with the selected target application specifying that the selected target application supports the action and the entity.

17. The method of claim 15, the passing comprising:
utilizing an operating system communication model to pass the entity context information and the action context information to the selected target application.

18. The method of claim 15, comprising:
responsive to the selected target application performing the action on the entity, generating an entry within an entity action log specifying that the action was performed on the entity by the selected target application.

19. A method for registering a target application for contextually aware task execution, comprising:
receiving a registration request to establish a data contract with a target application, the registration request comprising an entity and an action supported by the target application;
generating the data contract with the target application, the data contract specifying that the target application is capable of performing the action on the entity;
maintaining an entity definition for the entity, wherein the entity is a first business entity or a second business entity, the entity definition comprising one or more entity parameters defining the entity, the one or more entity parameters defining the entity based on a business name and a business location and including at least one entity parameter specifying that the action is capable of being performed on the entity; and
maintaining an action definition for the action, wherein the action is different based on whether the entity is the first business entity or the second business entity, the action definition comprising one or more action parameters defining the action, an action parameter specifying information used to perform the action;
identifying a target application capable of performing the action on the entity;
responsive to a selection of the action, causing a presenting of the identified target application;
responsive to the selection of the target application, causing a displaying of a populated action item within the selected target application, wherein the populated action item is populated with entity context information corresponding to the entity definition, and wherein the entity context information is received from another launched application; and
maintaining a metrics log comprising analysis data including a number of times the identified target application is selected.

20. The method of claim 19, comprising:
identifying the entity comprised within content of the another launched application;
specifying values for at least one entity parameter within the entity definition based upon the entity context information of the entity derived from the another launched application to generate an entity context;
exposing the action capable of being performed on the entity;
responsive to the selection of the action:
specifying values for at least one action parameter within the action definition based upon contextual information derived from the current application to generate an action context, and
responsive to a selection of the target application:
passing the entity context information and the action context to the selected target application so that the selected target application is launched according to the entity context information and the action context to complete a task.

\* \* \* \* \*